UNITED STATES PATENT OFFICE.

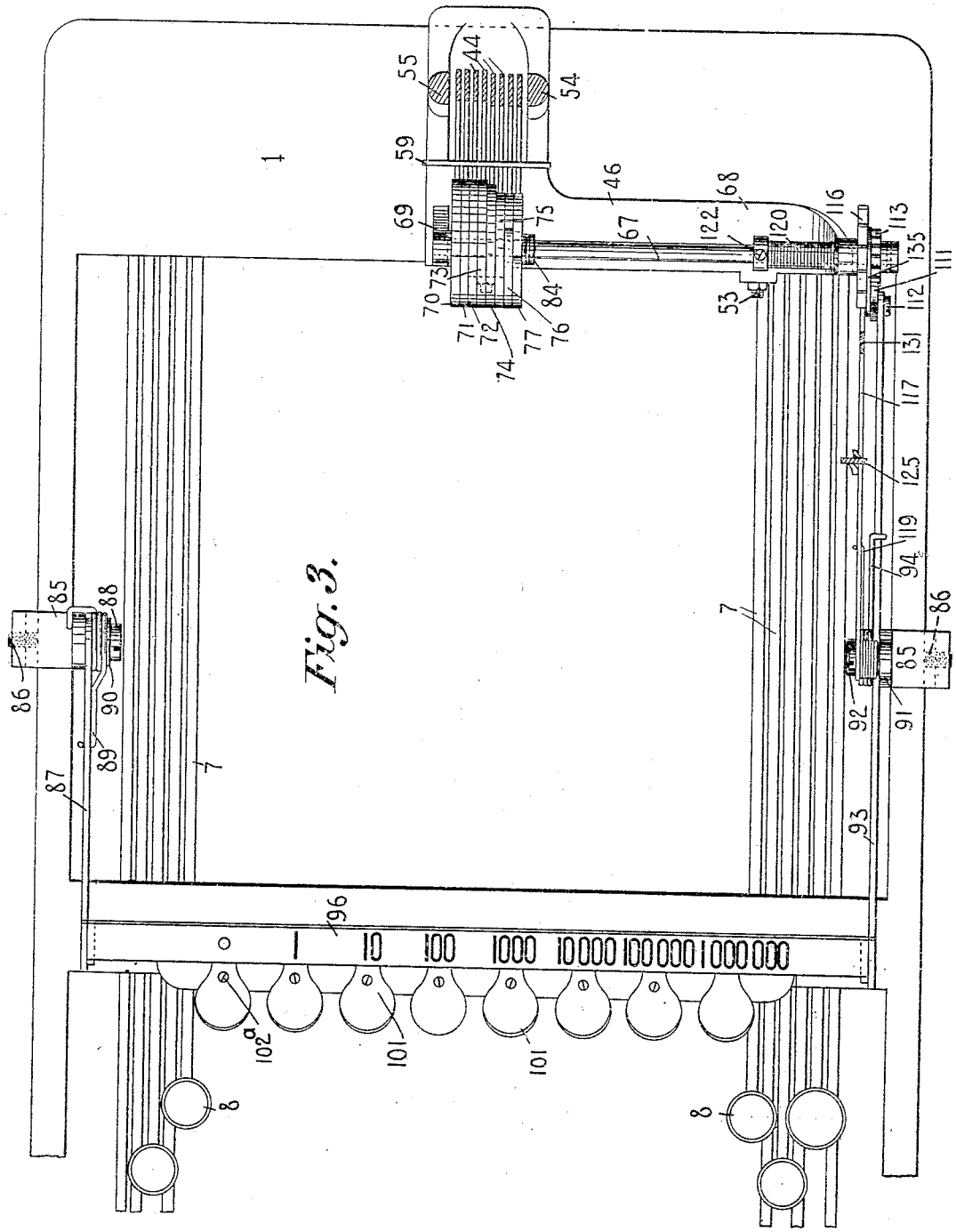

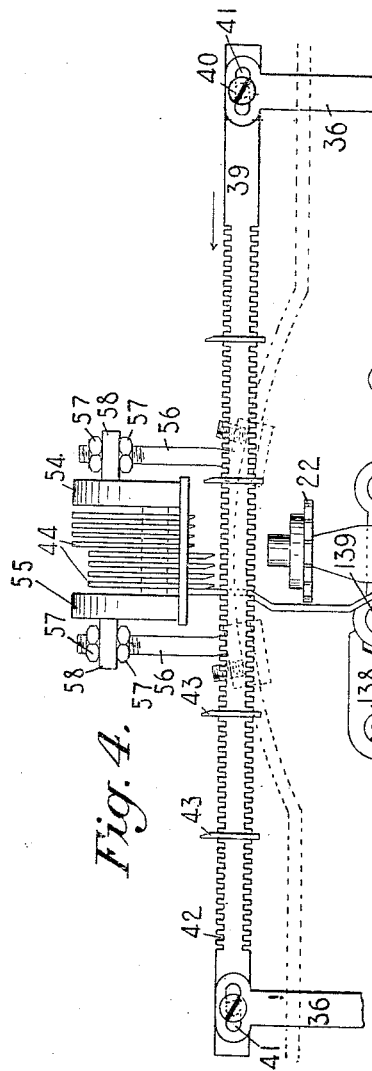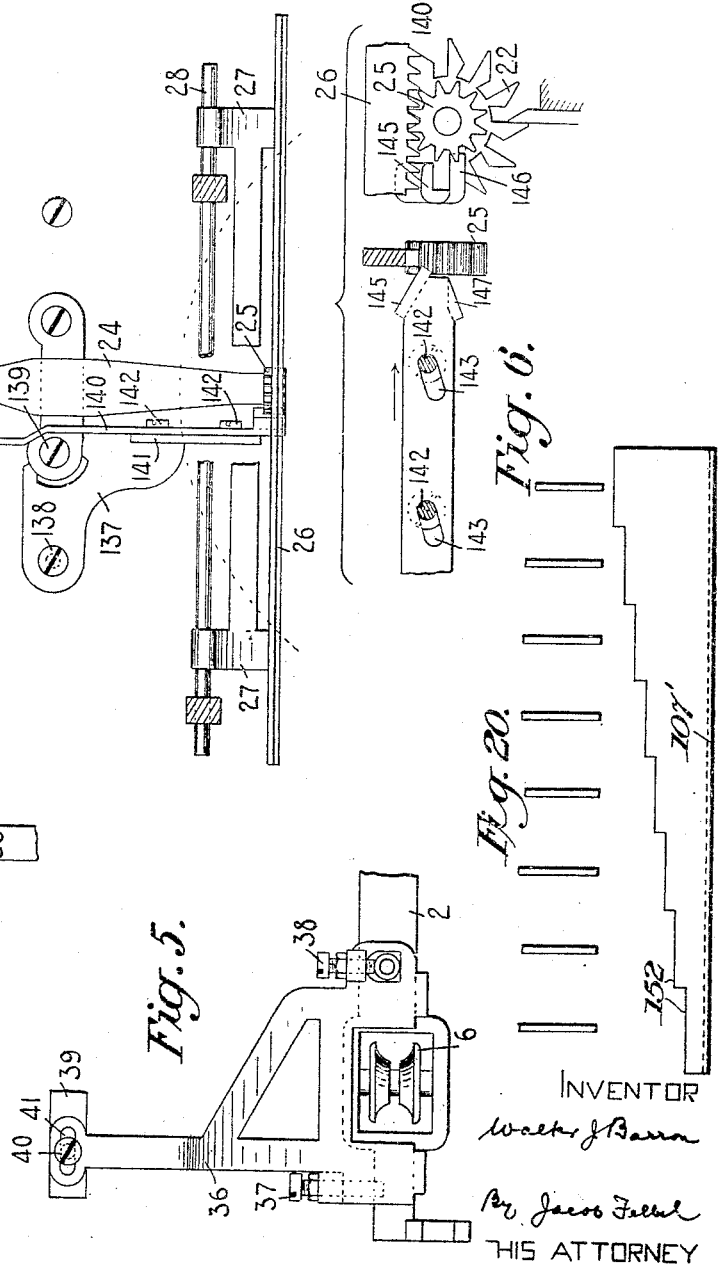

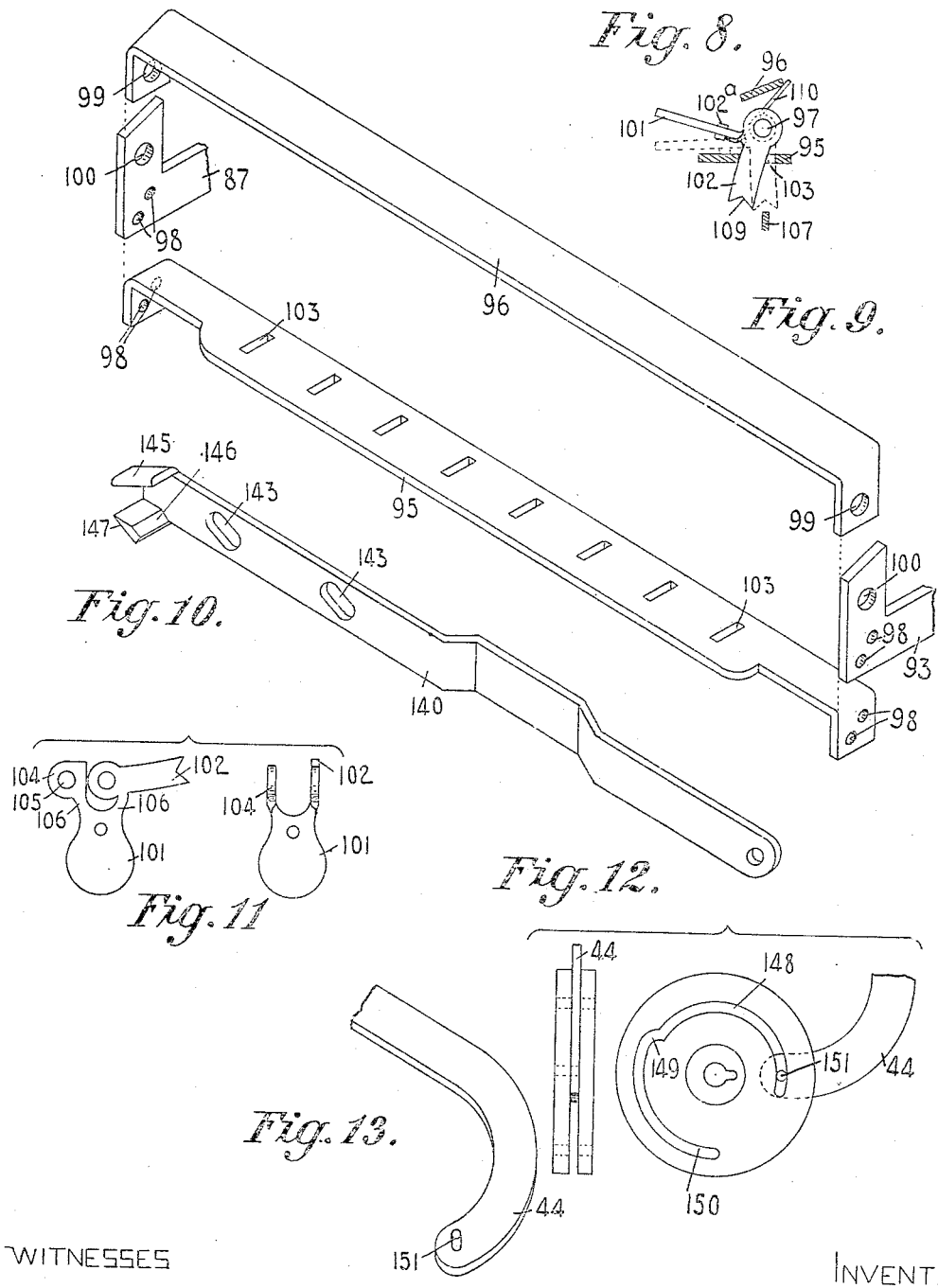

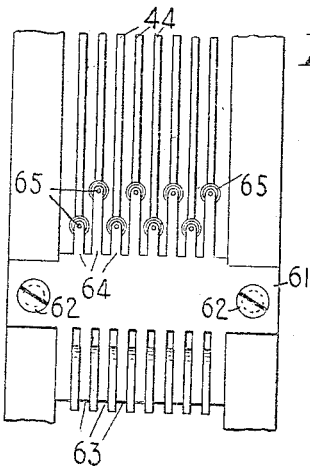
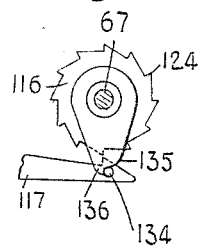
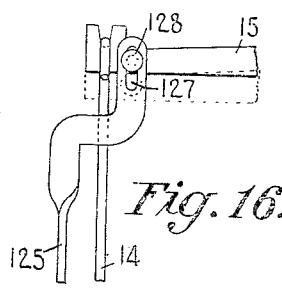
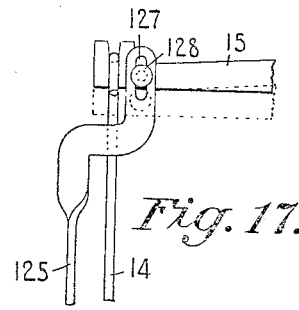
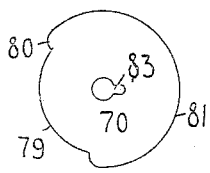
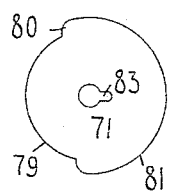
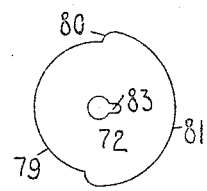
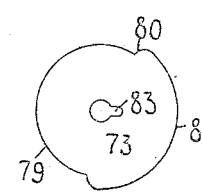
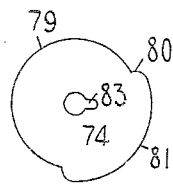
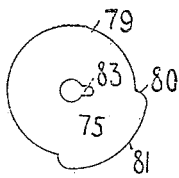
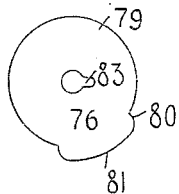
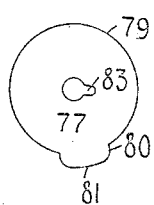

WALTER J. BARRON, OF NEW YORK, N. Y., ASSIGNOR TO UNION TYPEWRITER COMPANY, OF JERSEY CITY, NEW JERSEY, A CORPORATION OF NEW JERSEY.

TYPE-WRITING MACHINE.

956,028.   Specification of Letters Patent.   Patented Apr. 26, 1910.

Application filed April 28, 1908. Serial No. 429,728.

*To all whom it may concern:*

Be it known that I, WALTER J. BARRON, citizen of the United States, and resident of the borough of Brooklyn, city of New York, in the county of Kings and State of New York, have invented certain new and useful Improvements in Type-Writing Machines, of which the following is a specification.

My invention relates to typewriting machines and has for its principal purpose to provide an improved tabulator for such machines.

My invention consists in certain features of construction and combinations and arrangements of parts which will be fully described herein and particularly pointed out in the claims.

Figure 1:
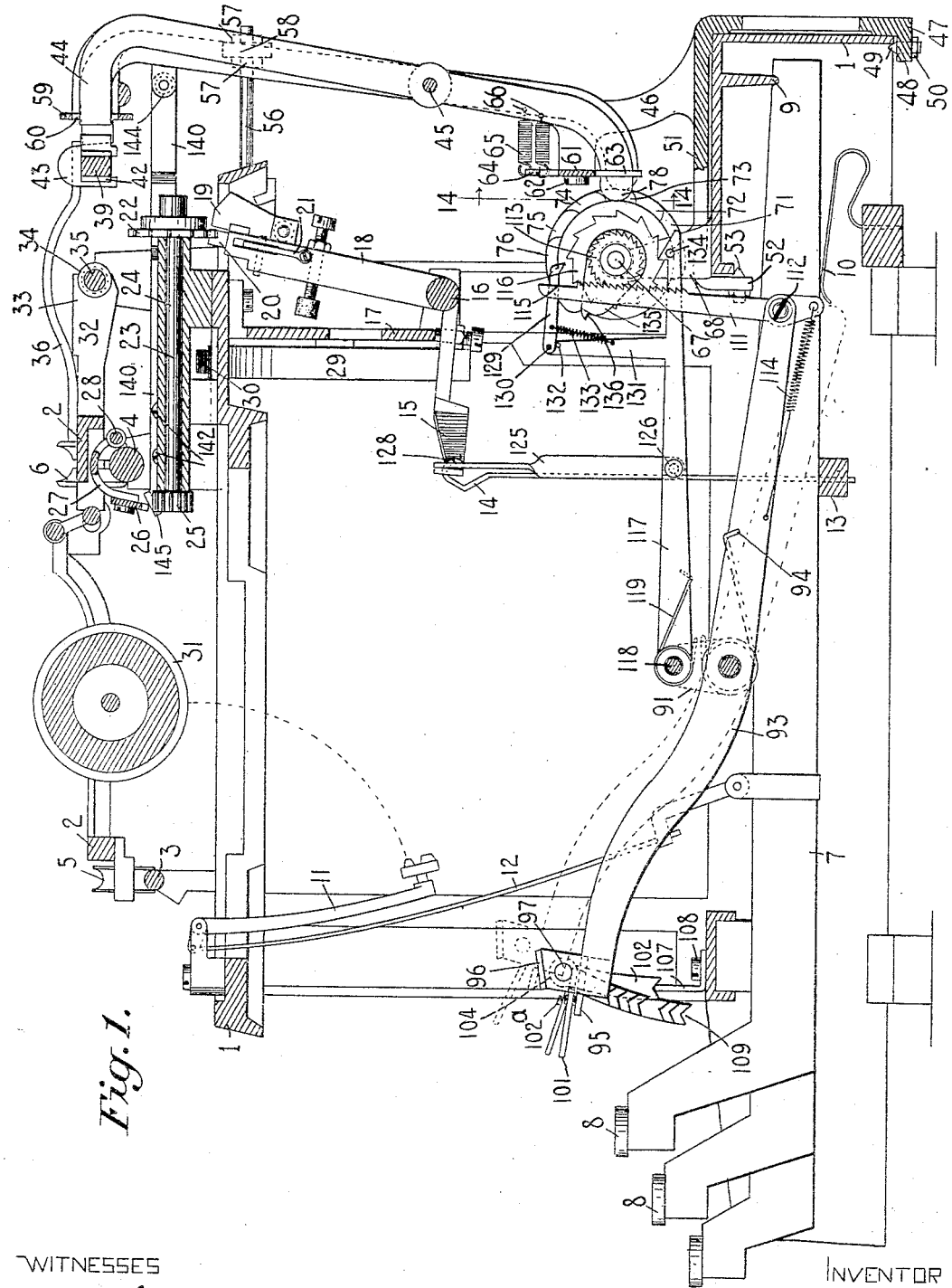
Figure 2:
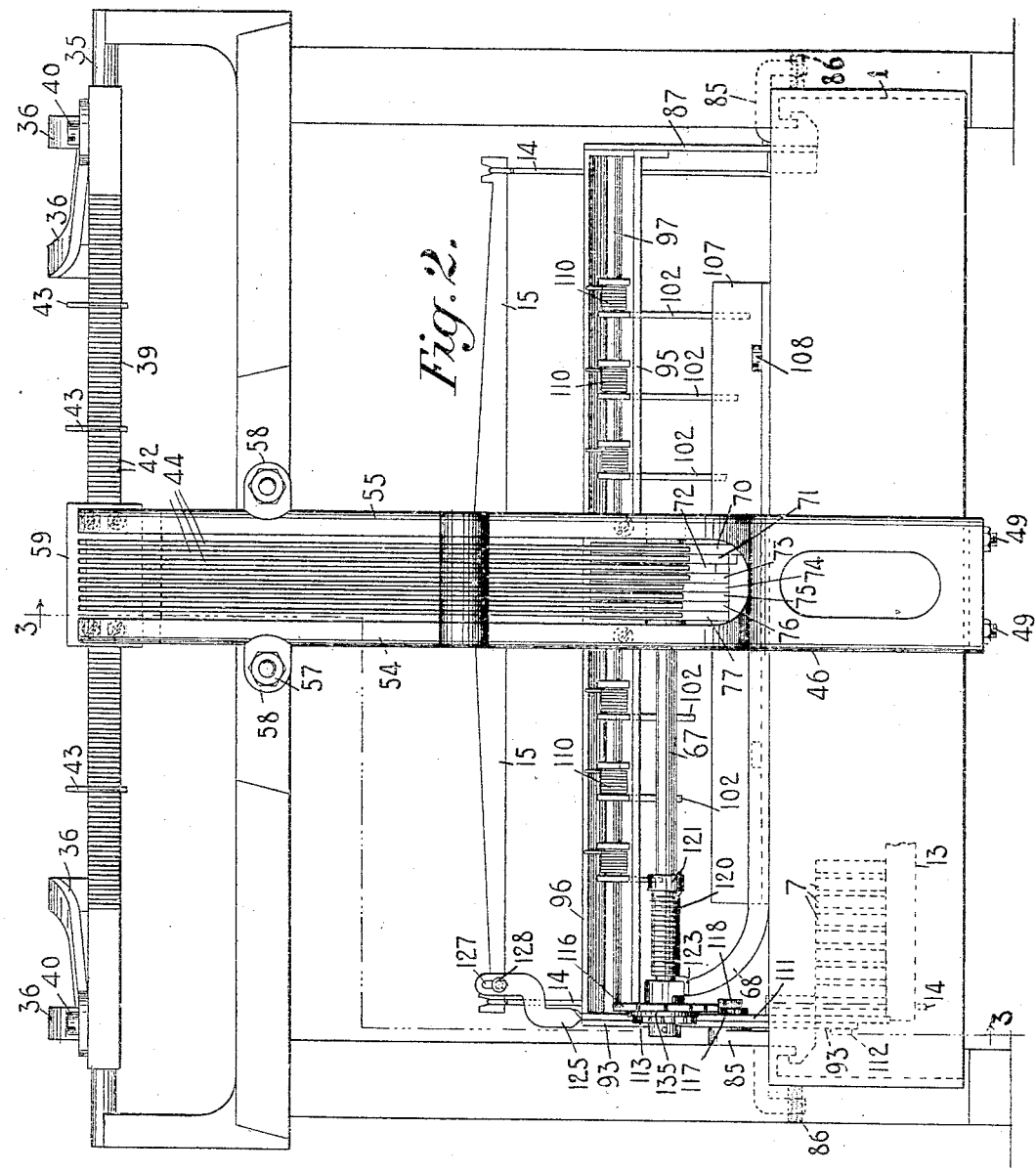

In the accompanying drawings forming part of this specification, Figure 1 is a longitudinal section through a typewriter having my improvements, parts of the typewriter mechanism being omitted for the sake of clearness. Fig. 2 is a back elevation of the same. Fig. 3 is a view, partly in horizontal section of the lower portion of the frame work of the typewriter showing parts of my mechanism and some of the keys of the typewriter. Fig. 4 is a top plan view of a portion of the mechanism showing the feed devices of the paper carriage and the stops of my tabulator. Fig. 5 is a detail view showing the arm connecting the column stop bar to the paper carriage. Fig. 6 shows two views, one a side elevation partly in section, and one an end elevation of a locking and releasing device employed in my mechanism, the same being in normal position. Fig. 7 is similar to Fig. 6, but shows the parts in operated position. Fig. 8 is a fragmentary view showing the framework of the denomination key mechanism in section and one of the denomination keys in elevation. Fig. 9 is a perspective view showing the construction of the yoke shaped frame supporting the denomination keys. Fig. 10 is a perspective view of a locking bar employed in my mechanism. Fig. 11 gives a face view of a denomination key and also of such key in process of manufacture. Fig. 12 illustrates a modified form of certain cams used in my mechanism. Fig. 13 is a perspective view of a lever coöperating with the cam shown in Fig. 12. Fig. 14 is a fragmentary back view of a portion of the machine. Fig. 15 is a face view of a retaining pawl and ratchet, the same being shown in normal position. Fig. 16 is a detail view of portions of the step-by-step feed mechanism and a releasing device which coöperates therewith, the parts being shown in normal position. Fig. 17 is a view similar to Fig. 16 but with the parts shown in the position they occupy when the denomination stops are set. Fig. 18 shows face views of a series of cams coöperating with the denomination stops. Fig. 19 is a detail view illustrating a shaft and a key for the same. Fig. 20 is a diagrammatic view showing a modification of the differential mechanism. In Figs. 1, 2 and 3 the parts are shown in the positions they occupy when the hundreds denomination key is depressed.

The same characters of reference are used to designate the same parts in the different views of the drawings.

I have shown my tabulating device in the form of an attachment fastened to a Remington No. 6 typewriter, but many of the features of my tabulator are adapted for use on other types of machines.

In the drawings, 1 is the main frame of a Remington typewriting machine.

2 is the carriage supported on rods 3 and 4 by rollers 5 and 6.

7 are the character keys having the usual buttons 8 and pivoted to the main frame on a flange 9 and held in normal position by springs 10. Said keys are connected to type bars 11 by links 12 and engage a universal bar 13, which is connected by links 14 to spreading arms 15 of an oscillating frame 16 pivoted to a hanger 17 depending from the top plate of the main frame. The frame 16 has an arm 18 carrying a pair of spacing dogs of which one 19 is fast to the arm and the other 20 is pivoted thereto and held in normal position by a spring 21. These dogs constitute an escapement which coöperates with an escapement wheel 22 connected to a shaft 23 journaled in a housing 24 and having fixed to its other end a pinion 25. A rack bar 26 is supported by arms 27 pivoted to the carriage at 28 and normally engages the pinion 25 but may be oscillated on its pivots 28 and thus lifted out of engagement with said pinion. The carriage is drawn across the machine by a spring drum 29 having a strap 30 wound about it and connected to the carriage. The carriage has the usual platen 31 and guide arm 32 in the bifurcated end 33 of which is a guide sleeve 34 running on a guide rod 35 fixed to the main frame of the machine.

The machine as thus far described is old and well known in the art.

Near each end of the carriage 2, I attach to said carriage an arm 36, preferably having the general form shown in Fig. 5. Each of said arms 36 is clamped to the carriage by screws 37 and 38. A column stop bar 39 is supported by said arms 36 by means of screws 40 preferably passing through elongated slots 41 in said arms, whereby said bar may be adjusted longitudinally of the carriage. The bar 39 is preferably rectangular in cross-section and has cut in two opposite faces thereof slits or grooves 42 spaced a distance apart equal to the letter spaces of the machine. I provide a number of column stops 43 consisting of plates having a U-shaped outline and of such dimensions that they may be readily slipped over the bar 39, fitting into the grooves 42. A series of denominational stops 44 are pivoted at 45 in a frame 46 so shaped and designed as to be readily clamped to the main frame of the typewriter. In the present instance this frame has a perpendicular portion 47 having at the bottom a flange 48 passing under a frame piece; and screws 49 threaded into said flange 48 have conical ends by which the frame 46 is tightly clamped to the frame piece. The screws are provided with lock nuts 50.

The frame 46 has a horizontal portion 51 extending over the back shelf of the typewriter and having a depending flange 52 with screws 53 similar to the screws 49 and serving to clamp the frame 46 to the frame of the machine at this point. The frame 46 has two perpendicular branches 54 and 55 connected to the top plate of the machine by rods 56 having threaded portions and nuts 57 between which are clamped ears 58 projecting from the frame pieces 54 and 55. The pivot rod 45 joins the frame pieces 54 and 55 and supports the denomination stops 44. A plate 59 is supported at the top of the frame 46 and has slots 60 therethrough, one for each denomination stop for the purpose of accurately guiding the same. Another plate 61 is attached to the frame 46 near the lower end of the stops 44 by screws 62. This frame has the comb-like form shown in Fig. 14. The lower teeth 63 of said comb serve to guide the lower ends of the stops 44 and the upper teeth 64 support springs 65, the other ends of which are connected at 66 to said levers 44 to hold the same in normal position. A shaft 67 is journaled in branches 68 and 69 of the frame 46. A series of cams 70, 71, 72, 73, 74, 75, 76 and 77 are fixed to said shaft 67, there being one of these cams for each denomination stop 44. Said stops 44 curve forwardly at their lower ends and have cam ends 78 coöperating with the several cams 70 to 77. Said cams 70 to 77 together constitute in effect a drum fixed to said shaft 67 and having a series of cam faces one for each stop; but in the present instance I prefer to form said cams of separate disks of metal, each disk having a circular portion 79 against which the cam end 78 of the stop normally rests, and a cam portion 80 joining the portion 79 to another circular portion 81 of greater radius than the portion 79. If any one of the cams be turned until its cam face 80 passes the cam end 78 of its lever 44, the lower end of such lever will be pressed to the rear of the machine and the upper end will be pressed forward into position to engage the column stops 43. As a convenient means of keying the disks 70 to 77 to the shaft 67 I have shown said shaft provided with a wire 81 bent at its ends and inserted in holes 82 in said shaft (see Fig. 19). When the disks are in position on the shaft the wire 81 passes through notches 83 in said disks, thus preventing any rotation of the disks on the shaft. The disks are prevented from moving longitudinally of the shaft by the bearing 69 at one side and a collar 84 fixed to the shaft at the other. Of course, collars may be provided at both ends of the series of cam disks.

A post 85, suitably formed, is clamped to the left hand side piece of the frame of the typewriter by means of a clamping screw 86. A bar 87 is pivoted to the post 85 by means of the shouldered screw 88, and extends toward the front of the machine. Said screw 88 has a shouldered portion about which is encircled a spring 89 retained in position by a washer 90 and at one end pressing upward on the bar 87 and at the other end held against the post 85. A post 91 is clamped to the right-hand side piece of the machine frame in a manner similar to the post 85. A shouldered screw 92 is threaded into said post 91, and on it is pivoted a lever 93 extending forwardly and upwardly parallel to the arm 87 and also extending toward the back of the machine. A spring 94 coiled about the screw 92 tends to depress the backward arm and to elevate the forward arm of the lever 93. The forward ends of the arm 87 and the lever 93 are connected by bars 95 and 96 and a rod 97.

As will be understood by reference to Fig. 9 the bar 95 is bent at its ends and fastened to the arm 87 and lever 93 as by rivets passing through holes 98. The bar 96 is bent downwardly at its ends and the depending portions are provided with holes 99 registering with holes 100 in the arm 87 and lever 93, said holes 99 and 100 being for the passage of the rod 97. The square ends of the depending portions of the bar 96 rest against the bar 95, thus forming a rigid framework. It will be seen that the bar 87 and lever 93 and the connecting members together constitute a yoke-shaped frame for the support of the denomination keys. Denomination keys 101 are pivoted on the rod 97 and have depending tongues 102 passing through slots 103 in the bar 95. These keys may be conveniently formed of sheet metal cut in the form shown in Fig. 11 with ears 104 having perforations 105 for the rod 97 and the tongue 102 formed as a portion of one of said ears. The ears are connected to the body of the key by necks 106 which may be twisted in the manner shown in Fig. 11 to form the key. A flange or rib 107 is fastened to the frame of the machine by screws 108 and is in such a position that if the frame be depressed the tongues of the keys would pass in front of the flange. But if any of the keys be depressed downward it will turn on its pivot until stopped by contact with the bar 95, and the tongue 102 will thus be brought into such position that if pressure upon the key be continued and the frame thus depressed, the tongue 102 will contact with the flange 107 as shown in Fig. 1 and arrest the downward motion of the frame. The tongues 102 are preferably formed with notches 109 in their ends. The keys are held in their normal position with the tongues 102 away from the flange 107 by springs 110 coiled about the rod 97 between the ears of the several keys each pressing at one end against a key and at the other end against the bar 96. The keys are prevented from moving longitudinally of the frame by the tongues 102 passing through the slots 103. Through the body portion of each of the keys except that of highest denomination, I pass a set screw 102$^a$ which contacts with the bar 95 to limit the motion of the key about its pivot. As the notched end 109 of each tongue 102 is of a beveled form the amount of downward motion of the frame permitted by each tongue may be regulated by adjusting the screws 102$^a$ to give varying amounts of motion to the keys on their pivots, as will be readily understood. A rack bar 111 is pivoted to the back end of the lever 93 by a shouldered screw 112 and coöperates with a pinion 113 fixed to the shaft 67. The rack bar 111 is pressed against the pinion 113 by a spring 114 connected at one end to a depending portion of the rack bar and at the other end to the lever 93. The teeth of the pinion 113 and of the rack 111 are of ratchet formation so that when the yoke frame is depressed and the rack bar 111 is elevated the shaft 67 will be rotated; but when the yoke frame is permitted to rise under the influence of the springs 89 and 94 the rack bar slips downward over the pinion until a smooth portion 115 rests against the teeth of the pinion. This is the normal position of the parts. Fixed to the shaft 67 to one side of the pinion 113, is a ratchet wheel 116. A pawl 117 is pivoted to the post 91 by a screw 118 coiled about which is a spring 119 one end of which presses upward against the pawl 117 and the other end of which presses against the post 91. The spring 119 presses the pawl against the ratchet 116 to retain the shaft 67 in the position to which it is moved by the rack 111. A spring 120 (Fig. 2) is coiled about the shaft 67 and is fastened at one end to a collar 121 held tightly on the shaft 67 by a set screw 122. The other end of the spring engages the arm 68 of the frame 46 at 123. The tension of this spring constantly tends to turn the shaft 67 in a direction opposite to that in which it is turned by the rack 111, and when the pawl 117 is tripped the spring returns the shaft to normal position.

I have shown eight denomination stop levers 44 and eight cams 70 to 77 coöperating therewith. These cams are so designed and so placed on the shaft 67 that a slight rotation of said shaft will cause the cam shoulder 80 of the disk 70 to engage the first of the stop levers 44 corresponding to the decimal point and press the same into operated position. A slightly further turn of the shaft presses the second stop lever 44 corresponding to the units place into operated position, and so on. It will be seen that the cam shoulders 80 are arranged spirally about the shaft 67 so that the several levers 44 are engaged thereby successively beginning with the one of lowest denomination. The teeth 124 of the ratchet 116 are spaced to correspond in angular position to the several cam shoulders 80 so that the pawl 117 may retain the shaft in position to hold any desired number of the stop levers in operated position. On the bar 96 opposite the several denomination keys 101 are placed characters (.), (1), (10), (100), etc. The tongue of the key marked (.) is the longest of any and so limits the motion of the yoke frame as to impart to the shaft 67 only a motion sufficient to cause the cam shoulder 80 of the disk 70 to press the first denomination stop into operative position and to cause the pawl 117 to engage the first of the teeth 124. The tongue of the denomination key marked (1) is slightly shorter than that of the key marked (.) allowing a slightly greater movement of the yoke frame and causing the cam disk 71 to press the second of the levers into operated position and the pawl to engage the second of the teeth 124. The tongues of the other denomination keys are successively shorter, allowing successively greater degrees of motion to the yoke frame and to the shaft 67 and bringing successive stop levers to operated position.

A pawl 129 is pivoted at 130 to an arm 131 projecting upward from the pawl 117. Said pawl 129 is drawn downward against a stop pin 132 by a spring 133 connected at one end to said pawl and at the other end to said arm 131. The pawl 117 is provided with a pin 134 which coöperates with a cam 135 fixed to the shaft 67 between the pinion 113 and the ratchet wheel 116. When the shaft is in the normal position shown in Fig. 15, said cam 135 depresses the pawl 117 out of engagement with the ratchet 116, and a shoulder 136 on said cam, engaging the pin 134, positively stops the shaft 67 at normal position. The pawl 117 is tripped to release the ratchet 116 by means connected to the universal bar 13 so that the depression of any character key or of the space bar will depress said pawl. The connection referred to consists of a link 125 pivoted to the pawl 117 at 126, and having at its upper end a slot 127 (see Figs. 16 and 17) through which loosely passes a pin or shouldered screw 128 fast to one of the arms 15 of the oscillating frame operated by the universal bar 13 for the purpose of operating the escapement mechanism to feed the carriage. When the shaft 67 is in its normal position the pin 134 holds the pawl 117 depressed as shown in Fig. 15, and the link 125 is then held in the position shown in Fig. 16 so that if character keys are operated the pin 128 plays idly up and down in the slot 127; but when the shaft 67 has been turned as shown in Fig. 1, the link 125 occupies the position shown in Fig. 17; and, if then a character key be depressed the pin 128 strikes the bottom of the slot 127 and depresses the pawl 117. When the pawl 117 is thus depressed, the pawl 129 is brought into the path of one of the teeth 124, and when the character key is released the shaft 67 is turned until the pawl 117 arrests a tooth next to the one previously held thereby, thus permitting the shaft 67 to rotate to a sufficient extent to release the highest of the denomination stops that has been operated. Upon the depression of another character key to print another number, the next denomination stop will be released and the carriage permitted to move another step. It will thus be seen that as the digits are printed the denomination stops are released one at a time by an auxiliary escapement mechanism consisting of the pawl 117 and its connections and the ratchet 116.

To the top frame plate of the machine I attach a bracket 137. For this purpose I may use a screw 138 and one of the screws 139 by which the housing 24 of the feed shaft 23 is fastened to the frame. A slide 140 is connected to a vertical portion 141 of said bracket by shouldered screws 142 threaded into said bracket and passing loosely through slots 143 in the slide 140. Said slide 140 is pivotally connected to the first or decimal denomination stop 44 by an ear 144 projecting from said stop, whereby the slide is reciprocated when the stop is moved to and from operated position. At its forward end the slide 140 is provided with a cam ear or projection 145 which, when the bar is slid to its forward position, passes under the rack bar 26 and cams the same upward out of engagement with the pinion 25, as shown in Fig. 7. In order to make this camming action more effective, the slots 143 extend at an angle with the length of the slide 140 so that the forward end of the slide is raised bodily to a slight extent as the slide is moved forward. It will thus be seen that the movement of the first denomination stop into operative position results in disconnecting the feed rack 26 from its pinion 25.

The rack 26 remains in its elevated position as long as any denomination stop is in operated position, but is dropped again into engagement with the pinion 25 when the last, or decimal stop, is withdrawn. It will thus be seen that, during the time when the tabulator is in use, the step-by-step feed of the carriage is controlled by the tabulator itself, and the ordinary carriage-feed mechanism is inoperative. I have shown the denomination stops 44 spaced a distance apart equal to the ordinary letter-space of the machine, and in most instances this will be the preferred construction; but it is obvious that said stops can be spaced in any other way desired so as to write the tabulated numerals with a spacing either wider or narrower than the ordinary letter-spacing, and either uniform or with intervals for punctuation, as may be be desired.

The tabulator mechanism and the means whereby the stops are restored one at a time to normal position as the printing keys are depressed, constitute a feed device for the carriage capable of controlling said carriage during part of its motion. The regular escapement devices constitute a second feed device for said carriage which comes automatically into operation when the carriage reaches the end of the part of its motion which is controlled by the tabulator and said second feed device controls the motion of the carriage after said carriage has passed out of the control of the tabulator.

The release of the rack 26 from the pinion 25 takes place when the character keys are in their normal position shown in Fig. 1 and when the spring pressed tongue 20 is in engagement with the escapement wheel 22. When the feed rack 26 is disengaged from the pinion 25, the escapement mechanism is freed from the tension of the spring in the drum 29 and the spring 21 therefore tends to turn the escapement wheel 22 backward to a slight extent. To prevent this action and to hold the tongue 20 against the tension of said spring, I provide a lock for the pinion 25. This lock consists of a rib 146 projecting inward toward the pinion 25 from the slide 140. This rib has a wedge-like form as shown in Figs. 6 and 7, and enters between two of the teeth of the pinion 25 when the slide is moved to its forward position, thus locking the pinion and escapement wheel. The lower side 147 of the wedge-shaped rib 146 is approximately parallel with the slots 143 so that the pinion is locked before the feed rack 26 is disengaged therefrom and remains locked until after the feed rack has reëngaged the pinion.

In Figs. 12 and 13 I have shown a modification of the cam devices on the shaft 67. According to this modification the cams are in the form of circular disks having cam slots, each slot comprising a circular portion 148, a cam portion 149 corresponding to the cam shoulders 80, and a circular portion 150 of greater radius than the circular portion 148 and corresponding to the circular portion 81. A pin 151 projects from the side of the denomination stop lever 44 into the cam slot 141, and guides the lever 44 in its movement. When this modification is used the springs 65 are unnecessary.

In Fig. 20 I have shown a modification of the differential mechanism according to which the bar 107' which corresponds to the bar 107 is provided with steps 152 of different heights and the tongues 102' depending from the several keys are all of the same length.

I am aware that many other modifications in details may be made in my invention without departing from the spirit thereof and I consider all such modifications to be within the scope of my claims.

What I claim as new and desire to secure by Letters Patent, is:—

1. In a typewriting machine, a tabulating device comprising a column stop, independently movable denomination stops, a series of tabulator keys, and a differential device operated through different distances by the different keys and operating said denomination stops.

2. In a typewriting machine, an adjustable column stop and a series of independent denomination stops, in combination with a differential mechanism, and means whereby said differential mechanism operates a number of said denomination stops depending on the extent of movement imparted to said differential mechanism.

3. In a typewriting machine, a column stop and a series of independent denomination stops, in combination with means acting at a single operation to adjust said denomination stops successively.

4. In a typewriting machine, a series of denomination stops and controlling means therefor having cams which engage said stops successively.

5. In a typewriting machine, a series of independent denomination stops, a series of keys and mechanism common to all of said keys for moving some of said stops relatively to others.

6. In a typewriting machine, a series of tabulator keys, a differential mechanism controlled thereby, and a series of denomination stops operated one after another by a single operation of said differential mechanism.

7. In a typewriting machine, a series of denomination stops independently movable into and out of operative position, and means operating at a single tabulating operation to move said stops out of operative position separately one after another.

8. In a typewriting machine, a series of denomination stops independently movable into and out of operative position; in combination with means for moving any desired number of said stops into operative position at a single operation and for successively returning the same to inoperative position.

9. In a typewriting machine, a column stop, a series of denomination stops and a rotary shaft having cam means for bringing any desired denomination stop into operative position.

10. In a typewriting machine, a column stop, a series of denomination stops; a rotary shaft having cam means for bringing any desired denomination stop to operative position according to the degree of motion imparted to the shaft; and means for imparting different degrees of motion to said shaft.

11. In a typewriting machine, a series of relatively movable denomination stops and a rotary shaft having controlling means for the several stops arranged spirally about the shaft.

12. In a typewriting machine, a series of denomination stops consisting of pivoted levers, and a shaft having spirally arranged cams for controlling said levers.

13. In a typewriting machine, the combination with a carriage and step by step feed devices therefor, of a denominational tabulator, means operated by said tabulator for releasing said carriage from said feed devices and locking certain of said feed devices, means whereby the tabulator controls the step by step feed of the carriage while the latter is in the columnar position determined by said tabulator, and means for restoring said carriage to the control of said step by step feed devices and releasing said lock when the carriage passes out of said columnar position.

14. In a typewriting machine, the combination with a carriage, step by step feed devices for said carriage, and printing devices, of a series of denomination stops, means for projecting a plurality of said stops at a time to operative position, means for restoring said stops one at a time, a carriage release device, and a lock for certain of said step by step feed devices controlled by the denomination stop of lowest order.

15. In a typewriting machine, the combination with a carriage having a feed rack pivoted thereto; of a pinion normally engaging said rack; and a movable member having a cam portion for raising said rack out of engagement with said pinion and a locking portion for locking said pinion.

16. In a typewriting machine, the combination with character keys and printing devices operated thereby, of a tabulating device comprising a series of denomination stops movable into and out of operative position, means for holding said stops in operative position, and means operated by the character keys for releasing said means.

17. In a typewriting machine, the combination with a tabulating device comprising a series of denomination stops movable into and out of operative position and means for holding said stops in operative position; of a carriage and feed devices therefor; and means for releasing said stops controlled by said feed devices.

18. In a typewriting machine, the combination with a carriage of a tabulator comprising a series of denomination stops; a shaft having cams for controlling said stops; means for turning said shaft to different positions according to the denomination to be printed; a retaining pawl for holding said shaft in its operated position; a spring tending to return said shaft to normal position, character keys and printing means operated thereby; and means operated by the character keys for releasing said pawl.

19. In a typewriting machine, a tabulator comprising a depressible frame; a flange for limiting the movement of said frame; finger keys pivoted in said frame whereby the same is depressed; stops connected to said keys and movable thereby into position to engage said flange, and set screws to limit the movement of said keys on their pivots.

20. In a typewriting machine, a tabulator comprising a depressible frame; keys mounted on the frame and having a limited play in the frame; and adjustable means for limiting the play of the keys in the frame.

21. In a typewriting machine, a tabulator comprising a depressible frame; keys mounted on the frame and having a limited play in the frame; beveled stops controlled by the keys; and adjustable means for limiting the play of the keys in the frame.

22. In a typewriting machine, a tabulator comprising a depressible frame, keys mounted on the frame and having a limited play in the frame; beveled stops controlled by the keys; a stationary flange coöperating with said stops; and adjustable means for limiting the play of the keys in the frame.

23. In a typewriting machine, a column stop and a series of independently movable denomination stops in combination with a member movable to different positions and operating to set any desired denomination stop according to the position to which it is moved, and a series of keys for moving said member to different positions.

24. In a typewriting machine, a column stop, a series of denomination stops; a rotary shaft having cam means for bringing any desired denomination stop to operative position according to the degree of motion imparted to the shaft; and a series of keys for imparting different degrees of motion to said shaft.

25. In a typewriting machine, a series of denomination stops and a rotary shaft having controlling means for the several stops arranged spirally about the shaft, in combination with means for adjusting said shaft to different positions.

26. In a typewriting machine, a series of denomination stops and a rotary shaft having controlling means for the several stops arranged spirally about the shaft; and a differential mechanism controlling said shaft.

27. In a typewriting machine, a series of denomination stops and a rotary shaft having controlling means for the several stops arranged spirally about the shaft, in combination with a series of keys and connections for controlling said shaft.

28. In a typewriting machine, the combination of a rotary shaft; a ratchet-rack and pinion for rotating said shaft differential distances; a series of keys and connections for operating said rack; said rack having a smooth portion which normally rests against the pinion, whereby said shaft may return to normal position independently of said rack; and tabulator stops controlled by said shaft.

29. In a typewriting machine, the combination of tabulating devices; a rotary shaft controlling said devices; a rack for rotating said shaft differential distances in one direction and returning to normal position independently of said shaft; a detent for holding said shaft in adjusted position; and means for returning said shaft to normal position.

30. In a typewriting machine, the combination with character keys; and a universal member operated by said character keys; of a tabulator stop movable into and out of operative position; means for retaining said stop in operative position; and a trip for said retaining means, normally out of position to be operated by said universal member but moving into position to be operated by said member when said stop is moved to operative position.

31. In a typewriting machine, the combination with a carriage and a step-by-step feed device therefor, of a tabulator having an auxiliary step-by-step feed device for controlling said carriage.

32. In a typewriting machine, the combination with a carriage and a step-by-step feed device therefor, of a tabulator having an auxiliary step-by-step feed device for controlling said carriage, said auxiliary feed device comprising an escapement mechanism.

33. In a typewriting machine, the combination with a carriage and a step-by-step feed device therefor, of a tabulator having an auxiliary step-by-step device for controlling said carriage, and means for rendering the first mentioned feed device inoperative when the tabulator is in operation.

34. In a typewriting machine, the combination with a carriage and an escapement mechanism normally operative to control the feed of the carriage step-by-step, of an auxiliary escapement mechanism normally inoperative; and means for rendering the first mentioned escapement mechanism inoperative and the auxiliary escapement mechanism operative to control the feed of the carriage step-by-step.

35. In a typewriting machine, the combination of a series of keys; a universal member operated by any of said keys; a carriage; a feed device for said carriage normally connected with said universal member; an auxiliary feed device for said carriage normally disconnected from said universal member; and means for disconnecting said first mentioned feed device from and connecting said auxiliary feed device to said universal member.

36. In a typewriting machine, the combination with a carriage, of a series of stops therefor; a series of keys; and means controlled by any of the keys for withdrawing the stops one by one as the keys are operated.

37. In a typewriting machine, the combination with a carriage, of a series of stops therefor; a series of keys; and means comprising an escapement mechanism controlled by any of the keys for withdrawing the stops one by one as the keys are operated.

38. In a typewriting machine, the combination with a series of keys and printing means controlled thereby, of a carriage; and a tabulator; said tabulator comprising a series of stops movable into and out of position to arrest the carriage; and means controlled by the keys for moving said stops out of arresting position one at a time as the keys are depressed to print.

39. In a typewriting machine, the combination with a spring-drawn carriage and a series of keys, of an independently spring-impelled rotary member; an escapement controlling said member and controlled by the keys; and means controlled by said member to afford to the carriage a step-by-step feed under the impulse of its spring.

40. In a typewriting machine, the combination with a carriage, of a feed device therefor capable of controlling the carriage during part of its motion; and a second feed device for said carriage automatically coming into operation when the carriage reaches the end of the part of its motion which is controlled by the first mentioned feed device, and controlling the motion of the carriage thereafter.

41. In a typewriting machine, the combination with a carriage, a feed device therefor, and a series of keys, of a tabulator comprising a series of stops, one for each denomination; means for moving said stops to operative position; means connected to the stop of lowest denomination for rendering said feed devices inoperative; and means operating to withdraw the stops one at a time.

Signed at the borough of Manhattan, city of New York, in the county of New York, and State of New York this 27th day of April A. D. 1908.

WALTER J. BARRON.

Witnesses:
CHARLES E. SMITH,
J. B. DEEVES.